Figure 1:
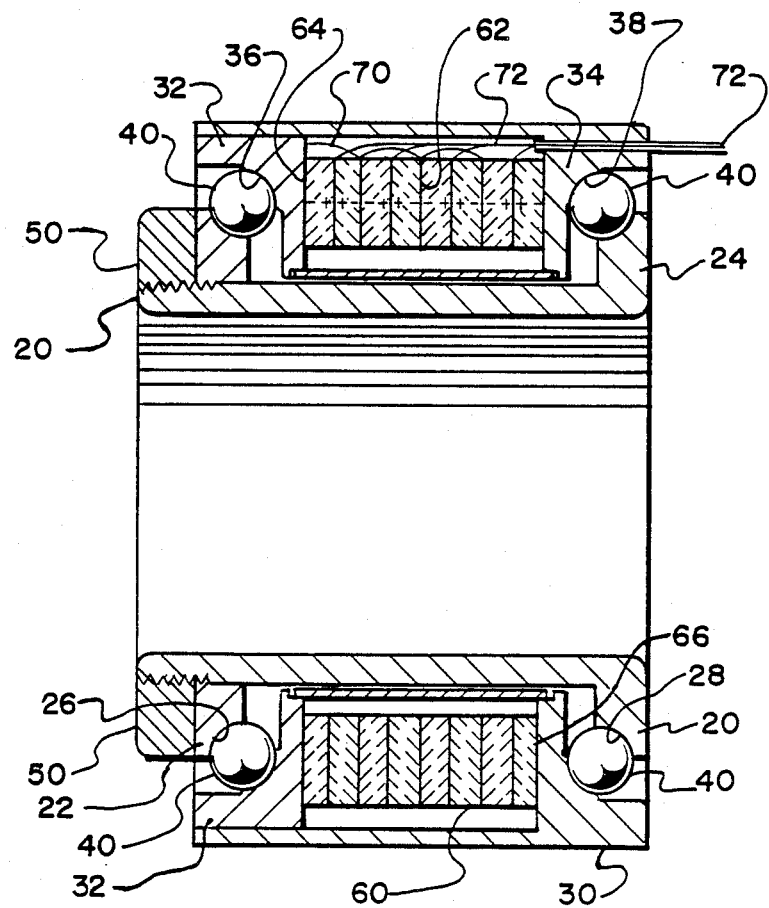

United States Patent [19]

Moseley et al.

[11] Patent Number: 4,850,719
[45] Date of Patent: Jul. 25, 1989

[54] BEARING WITH ADJUSTABLE STIFFNESS

[75] Inventors: John Moseley, Norfolk; Daniel McLarty, Burlington, both of Conn.

[73] Assignee: The Torrington Company, Torrington, Conn.

[21] Appl. No.: 242,584

[22] Filed: Sep. 12, 1988

[51] Int. Cl.⁴ .............................................. F16C 19/08
[52] U.S. Cl. ........................................ 384/1; 384/517; 384/519; 384/563; 384/583
[58] Field of Search ................... 384/1, 519, 583, 517, 384/563, 557, 493

[56] References Cited

U.S. PATENT DOCUMENTS

| | | | |
|---|---|---|---|
| 4,593,956 | 6/1986 | Caruso et al. | 384/1 |
| 4,613,240 | 9/1986 | Hagelthorn | 384/583 |
| 4,657,412 | 4/1987 | McLarty et al. | 384/1 |
| 4,727,762 | 3/1988 | Hayashi | 384/517 |

*Primary Examiner*—Lenard A. Footland
*Attorney, Agent, or Firm*—W. O. Traynham

[57] ABSTRACT

A variable stiffness bearing utilizing piezoelectric means for applying a variable preload force to the bearing. The preferred embodiment employs piezoelectric wafers having alternating power and ground connections to the wafers to allow the wafers to distort in direct proportion to the potentials applied. Increased potentials result in greater distortion, more preload force, and a stiffer bearing.

3 Claims, 1 Drawing Sheet

BEARING WITH ADJUSTABLE STIFFNESS

This invention relates to bearings having means for varying the amount of preload on the bearing; more particularly, it relates to ball or roller bearings having piezoelectric means for adjusting the bearing stiffness.

Prior art patents disclose structures which employ piezoelectric or piezoceramic elements. These patents disclose cylindrical, squeeze-film type bearing systems wherein the piezoelectric elements are energized to vibrate or oscillate to create a gas film. Examples of this type of prior art include U.S. Pat. No. 4,545,625 for a "Prestressed Cylindrical Squeeze Bearing Member" issued in the name of Mats A. Engwall on Oct. 8, 1985, and U.S. Pat. No. 3,359,045 for a "Squeeze Film Bearing" issued in the name of Stephen K. Hsu on Dec. 19, 1967.

Other prior art patents disclose piezoelectric units with multiple plates which are secured together face to face so as to result in twisting and flexing of the units when a potential difference is applied to the units. An example of this type of prior art is U.S. Pat. No. 2,278,966 for a "Piezoelectric Apparatus" issued in the name of Alfred L. W. Williams on Apr. 7, 1942.

The prior art does not disclose a bearing assembly or system which can provide a preload force to the bearing assembly which is variable by piezoelectric means. The present invention solves this problem by providing a bearing with adjustable stiffness, using piezoelectric material.

Briefly described, the bearing of the present invention comprises an inner race assembly, an outer race assembly, multiple roller elements, and piezoelectric means for varying the preload force so as to adjust the bearing stiffness. Mechanical means for providing an initial preload force may also be utilized as an optional feature. The outer race assembly has two axially separated race members which abut against roller elements or ball bearings. These two sets of roller or ball bearings are mounted so as to be preloaded against each other. In the preferred embodiment of this invention, multiple piezoelectric wafers having electrically conductive interfaces between them are stacked together between the two axially separated outer race members. The interfaces are electrically connected so as to provide alternating electrical potentials resulting in distortion of the wafers which is directly proportional to the magnitude of the electrical potentials on the wafers, thereby allowing for control of the distortion and the resultant preload force.

This invention may be better understood by reference to the following detailed description and drawing in which:

FIG. 1 is a cross-sectional view in elevation of the bearing of the present invention.

Referring to FIG. 1, a bearing assembly 10 comprises an inner race assembly 20, an outer race assembly 30 having a first member 32 and a second member 34, ball bearings or roller elements 40, a threaded nut 50 for providing initial preload force, multiple annular ring-shaped piezoelectric wafers 60 having electrically conductive interfaces 62 and two end faces 64 and 66, and electrical leads 70 and 72 to provide ground connections 70 and power supply connections 72, respectively, to the interfaces 62 and end faces 64 and 66. Inner race assembly 20 has two radially outwardly projecting flanges 22 and 24 at each of its axial ends. Flange 22 has a first inner raceway 26 on its outer surface, and flange 24 has a second inner raceway 28 on its outer surface. First member 32 of outer race assembly 30 has a first outer raceway 36 on its inner surface, and second member 34 has a second raceway 38 on its inner surface. As can be seen in FIG. 1, roller elements or balls 40 are positioned between raceways 26 and 36, and between raceways 28 and 38, so as to take loads which are partially radial and partially axial. These raceways may be placed in other desired orientations so as to load roller elements or ball bearings 40 with more radial force or with more axial force, as the specific application may require.

The advantages of the present invention include the fact that the preload force applied by multiple piezoelectric wafers 60 to the members 32 and 34, and hence to bearing 10, is easily variable by controlling the amount of D.C. potential applied to interfaces 62 of wafers 60. This characteristic of the invention facilitates adjustment of the bearing stiffness in order to maximize the life of the bearing and provide for optimal bearing speed capabilities. Initial preload force is applied by tightening nut 50 to a desired position so as to exert a predetermined force against the bearing.

Normally, a high degree of stiffness is required in order for a bearing to support a shaft accurately under varying load conditions. A typical bearing configuration utilized to provide this stiffness employs two sets of angular ball or roller bearings which are preloaded against each other. Preloading, however, also results in increased stresses in the bearing, resulting in increased heat generation and reduced bearing life. Bearing speed is usually required to be limited as a result also. :-n many bearing applications, the need for high stiffness exists mainly at low speeds. If the preload force applied could be easily varied according to need, then the accuracy, life, and maximum speed of the bearing could be increased. The bearing of the present invention provides means for easily varying the preload force, thus allowing the operator to easily adjust the bearing stiffness to a value most suitable for the combination of speed and stiffness required for a particular application.

Another advantage of the present invention includes the way in which the electrically conductive interfaces 62 and end faces 64 and 66 are positioned in the bearing in order to optimize the bearing structure. In the preferred embodiment of the invention, an even number of wafers 60 are employed, thereby allowing the two end faces 64 and 66 to be connected to ground leads 70 while still allowing alternating potentials for the remaining interfaces 62. This eliminates the necessity for insulation between end face 64 and member 32, and between end face 66 and member 34. This allows for a simpler and more elegant design for the bearing without sacrificing any performance capabilities.

Piezoelectric ceramic actuators in the form of wafers 60 are the preferred embodiment of the means for providing a controllable variation in preload, but other piezoelectric means may be used in a similar fashion. For example, quartz crystals, in substantially the same form as wafers 60, would provide one possible modified embodiment of this invention. Wafers 60 may also be made of any other material which exhibits piezoelectric characteristics and suitable mechanical properties.

We claim:
1. An adjustable stiffness bearing comprising:
   an inner race assembly having first and second inner raceways;

an outer race assembly having first and second outer raceways axially and radially aligned with said firs and second inner raceways, respectively;

multiple roller elements positioned between said first inner raceway and said first outer raceway and between said second inner raceway and said second outer raceway; and piezoelectric means for applying a variable preload force to said bearing so as to provide an adjustable stiffness for said bearing.

2. An adjustable stiffness bearing comprising:

an inner race assembly having a first cylindrical sleeve portion with a first axial end and a second axial end, said first end having a first annular flange projecting radially outward so as to provide a first inner raceway on the outer surface of said first flange, and said second end having a second annular flange projecting radially outward so as to provide a second inner raceway on the outer surface of said second flange;

an outer race assembly comprising a second cylindrical sleeve portion concentric with said first cylindrical sleeve portion, a first member, and a second member, said first member being positioned radially inwardly from said second sleeve portion and axially aligned with said first annular flange and providing a first outer raceway on the inner surface of said first member, and said second member being positioned radially inwardly from said second sleeve portion and axially aligned with said second annular flange and providing a second outer raceway on the inner surface of said second member;

multiple roller elements positioned between said first inner raceway and said first outer raceway and between said second inner raceway and said second outer raceway; and piezoelectric means for applying a variable preload force to said first and second members of said outer race assembly so as to adjust the stiffness of said bearing.

3. A bearing according to claim 2 further comprising a variable power supply electrically connected to said bearing, wherein said piezoelectric means comprises multiple wafers made of piezoelectric material and stacked axially between said first and second members of said outer race assembly, said wafers having electrically conductive sides, each of said sides being electrically connected to said power supply or to ground to provide alternating power and ground potentials so as to cause said wafers to distort and thereby apply preload force to said first and second members, whereby bearing stiffness can be varied by adjusting said variable power supply potential applied to said wafer sides.

* * * * *